G. BOETTLER.
TRACTION PLOW.
APPLICATION FILED MAR. 21, 1910.
1,004,139.
Patented Sept. 26, 1911.
3 SHEETS—SHEET 1.
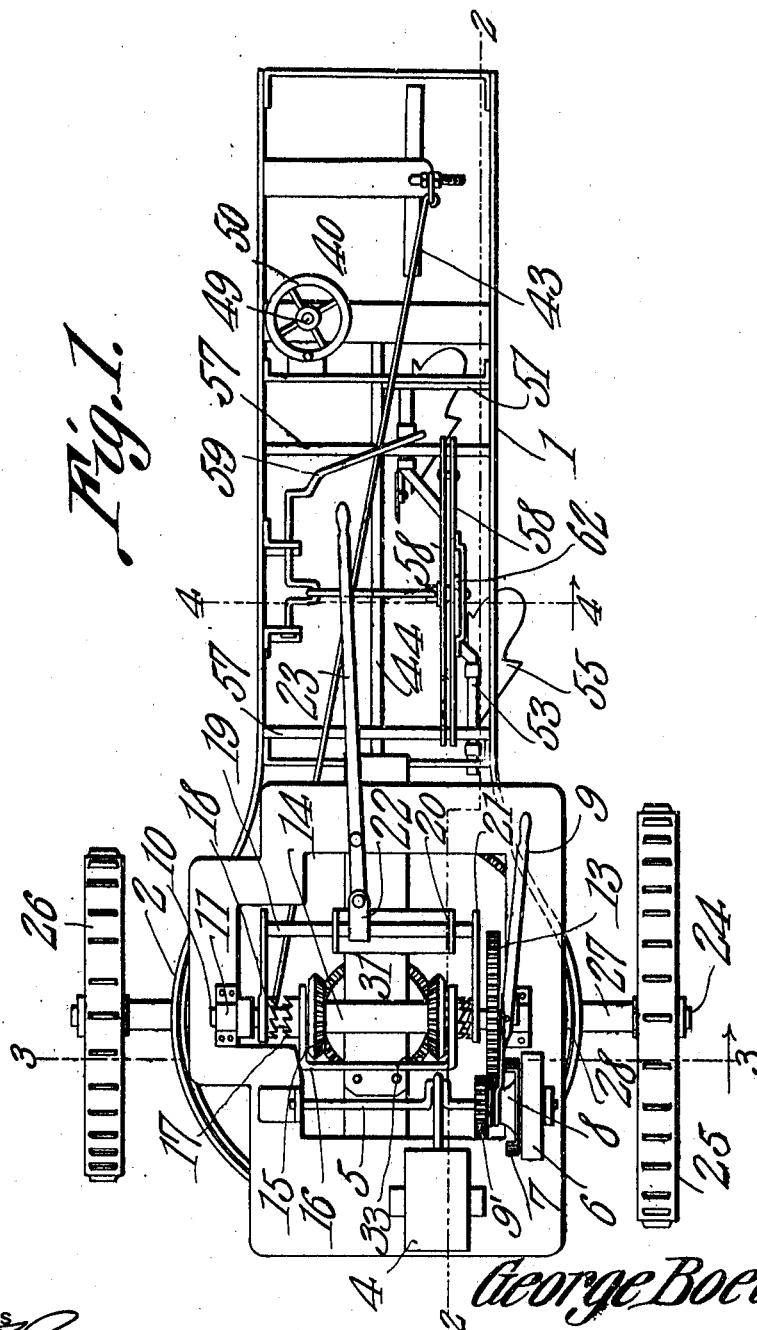
Witnesses
George Boettler
Inventor.
Attorneys G. BOETTLER.
TRACTION PLOW.
APPLICATION FILED MAR. 21, 1910.
1,004,139.
Patented Sept. 26, 1911.
3 SHEETS—SHEET 2.
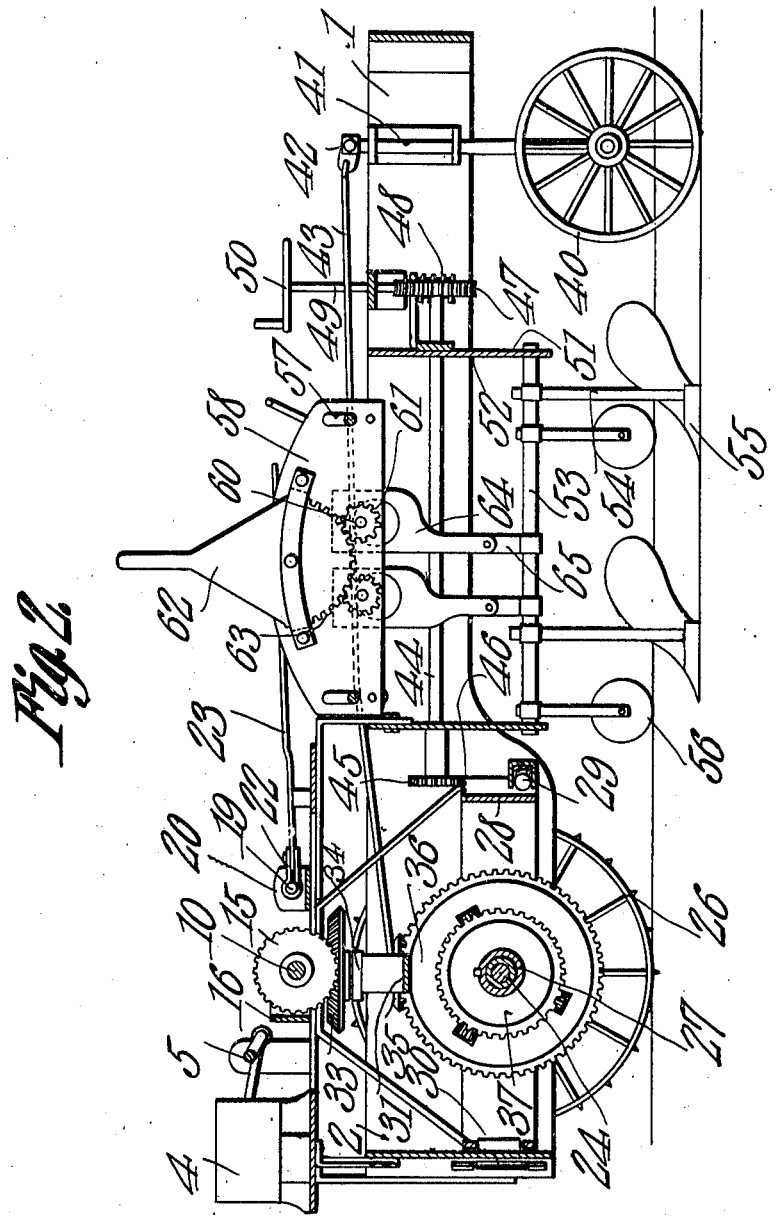
George Boettler
Inventor
Witnesses
by
Attorneys G. BOETTLER.
TRACTION PLOW.
APPLICATION FILED MAR. 21, 1910.
1,004,139.
Patented Sept. 26, 1911.
3 SHEETS—SHEET 3.
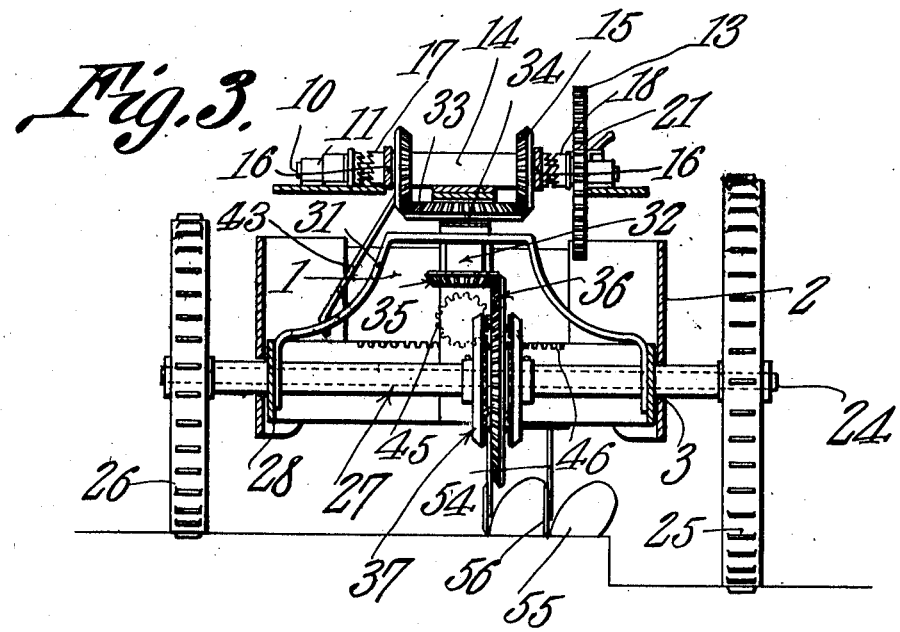
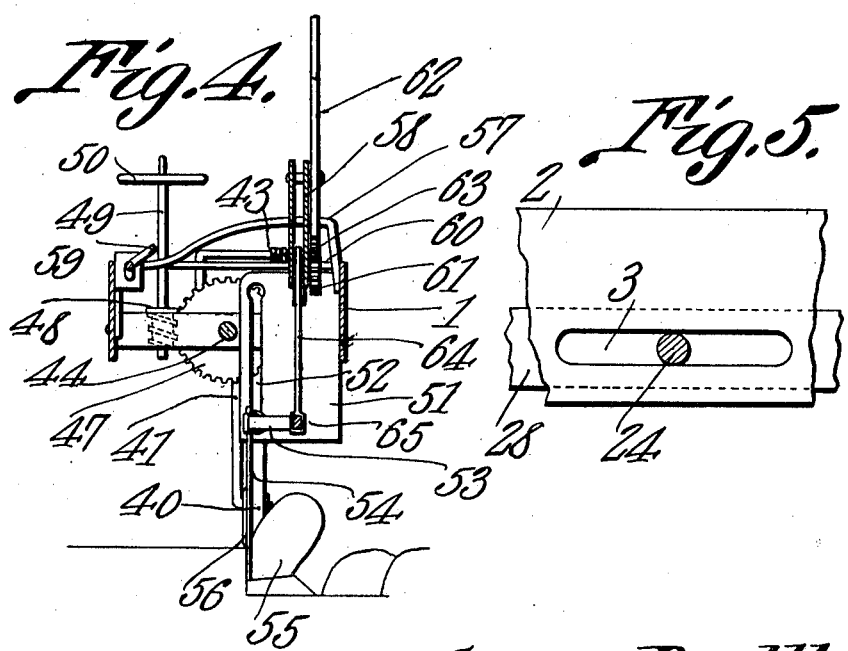
Witnesses
George Boettler,
Inventor.
by C. A. Snow & Co.
Attorneys

UNITED STATES PATENT OFFICE.

GEORGE BOETTLER, OF ST. PETERS, MISSOURI.

TRACTION-PLOW.

1,004,139. Specification of Letters Patent. Patented Sept. 26, 1911.

Application filed March 21, 1910. Serial No. 550,628.

*To all whom it may concern:*

Be it known that I, GEORGE BOETTLER, a citizen of the United States, residing at St. Peters, in the county of St. Charles and State of Missouri, have invented a new and useful Traction-Plow, of which the following is a specification.

This invention relates to a traction plow and it consists in the novel construction and arrangement of its parts as hereinafter shown and described.

The object of the invention is to provide a traction plow which consists of a frame upon which is mounted an engine. The forward portion of the frame is supported upon a dirigible truck which in turn is supported upon traction wheels of different sizes and which are operatively connected with the engine upon the said frame. The rear portion of the said frame is supported upon a caster wheel which is operatively connected to said truck to be guided simultaneously with the same.

A further object of the invention is to provide in combination with a structure as above indicated a beam adapted to support a gang of plows with means for raising and lowering said beam and means for swinging the beam in order that the plows may be disposed at desired angles to the surface of the soil.

In the accompanying drawings:—Figure 1 is a top plan view of the plow. Fig. 2 is a vertical longitudinal sectional view of the same cut on the line 2—2 of Fig. 1. Fig. 3 is a vertical transverse sectional view of the same cut on the line 3—3 of Fig. 1. Fig. 4 is a vertical transverse sectional view of the rear portion of the plow frame cut on the line 4—4 of Fig. 1. Fig. 5 is a detail view of a portion of the frame of the plow.

The plow includes a frame 1 which is provided at its forward end with an approximately circular head portion 2. The portion 2 is provided at its opposite sides with elongated slots 3. An engine 4, (preferably of the explosive compression type) is mounted upon the head portion 2 of the frame 1 and is operatively connected with a crank shaft 5 also mounted upon the said portion 2 of the frame 1. A friction member 6 is mounted upon the crank shaft 5 and is adapted to be engaged by friction shoes 7 carried by a member 8 which is slidably mounted upon the shaft 5 and which is constrained to rotate in unison therewith. A lever 9 is fulcrumed upon the head portion 2 of the frame 1 and is operatively connected with the member 8 and is adapted to slide the same upon the shaft 5 so that the shoes 7 thereof may be brought into frictional contact with the friction member 6. A gear wheel 9" is mounted upon the member 8 or may be formed integral with the same.

A shaft 10 is journaled for rotation in bearings 11 provided upon the enlarged portion 2 of the frame 1 and a gear wheel 13 is fixed to the shaft 10 and meshes with the gear wheel 9' upon the member 8. A sleeve 14 is journaled upon the intermediate portion of the shaft 10 and spaced pinions 15 are journaled upon the shaft 10 and are located adjacent the ends of the said sleeve 14. The beveled gear wheels 15 are held in position against the ends of the sleeve 14 by means of a yoke 16 which is attached at a point intermediate its ends to the enlarged portion 2 of the frame 1. The several gear wheels 15 are provided with clutch hubs 17. Clutch members 18 are slidably mounted upon the shaft 10 but are constrained to rotate in unison with the same. A clutch member 18 is located adjacent the clutch hub 17 of a beveled gear wheel 15 but the clutch members 18 at the opposite sides of the machine are connected together as will be explained.

A bar 19 is slidably mounted in a yoke 20 provided upon the enlarged portion 2 of the frame 1. Arms 21 are attached to the ends of the bar 19 and also connected with the clutch members 18 above described. A collar 22 is fixed to the intermediate portion of the bar 19 and one end of a lever 23 is pivotally connected with said collar 22 and the said lever 23 is fulcrumed upon the enlarged portion 2 of the frame 1. By this arrangement it will be seen that by swinging the lever 23 that the collar 22 and the bar 19 will be moved transversely of the machine and the said bar 19 will carry with it the arms 21 which in turn will engage either one or the other of the clutch members 18 with the adjacent clutch hub 17 of one of the beveled gear wheels 15. Thus one or the other of the gear wheels 15 will be rotated and when one is rotated in the manner as indicated, it will be seen that the clutch members 18 are such distance apart that the other gear wheel 15 is not rotated from the shaft 10.

An axle 24 passes transversely through the slots 3 provided at the opposite sides of the enlarged head 2 of the frame 1 and traction wheels 25 and 26 are located upon the end portions of the said axle. The traction wheel 25 is of greater diameter than the traction wheel 26 and is adapted to travel in the furrow, while the said traction wheel 26 is adapted to travel upon the surface of the unbroken ground. The traction wheels 25 and 26 are mounted upon sleeves 27 which in turn are journaled upon the axle 24 above mentioned. A frame 28 is mounted upon the sleeve 27 and fits snugly within the enlarged circular portion 2 of the frame 1. The said frame 28 may turn in the enlarged portion 2 of the frame 1 and is prevented from having undue frictional contact with the same by means of anti-friction devices 29 and 30 located at appropriate points along the enlarged portion 2 of the frame 1. A yoke 31 is secured at its ends to the frame 28 and forms a component part of the truck frame of which the part 28 is also a member. A stub shaft 32 is journaled for rotation in the intermediate portion of the yoke 31 and is provided at its upper end with a beveled gear wheel 33 which meshes with both of the beveled gear wheels 15. An anti-friction bearing 34 is provided for the shaft 32 and is located above the intermediate portion of the yoke 31. A beveled pinion or gear wheel 35 is fixed to the lower end of the stub shaft 32 and meshes with a beveled gear wheel 36 which is fixed to the axle 24 and which forms a component member of a compensating gearing of which gear wheels 37 also form component parts. The gear wheels 37 are fixed to the inner ends of the sleeves 27 while the gear wheel 36 is mounted upon the axle 24, as indicated.

From the above description it will be seen that as rotary movement is transmitted from the shaft 10 through one of the beveled gear wheels 15 to the shaft 32, the said shaft will be turned in one direction, but when rotary movement is transmitted to the said shaft 32 through the other beveled gear wheel 15 the said shaft 32 will be rotated in the opposite direction. Thus while the crank shaft 5 may rotate continuously in one direction means is provided for transmitting rotary movement from the said crank shaft 5 in either direction to the shaft 32 and from the shaft 32 through the transmitting part to the traction wheels 25 and 26.

A caster wheel 40 is located at the rear end of the frame 1 and is provided with a frame 41 the shank of which is journaled in the rear portion of the frame 1. The upper portion of the shank of the frame of the caster wheel 40 is laterally disposed as illustrated in Fig. 1 of the drawings and the rear end of a connecting rod 43 is adjustably attached thereto. The forward end of the said connecting rod 43 is pivotally connected with one end portion of the yoke 31 as illustrated in Fig. 3 of the drawings. A shaft 44 is journaled for rotation upon the frame 1 and is provided at its forward end with a gear wheel 45 which meshes with a gear rack 46 formed at the upper edge of the rear portion of the frame 28. A worm wheel 47 is fixed to the rear end of the shaft 44 and is engaged by a worm 48 fixed to the lower portion of a vertically disposed shaft 49. The shaft 49 is journaled for rotation at the rear portion of the frame 1 and is provided at its upper end with a hand wheel 50. Thus it will be seen that as the shaft 49 is rotated through the instrumentality of the wheel 50 the worm 48 engaging the worm wheel 47 will rotate the shaft 44 and through the said shaft and the intermeshing gear wheel 45 and gear rack 46 the frame 28 will be turned within the forward enlarged portion 2 of the frame 1. It is of course understood that as the frame 28 rotates within the portion 2 of the frame 1 that the axle 24 and the parts mounted thereon will be swung about a vertical axis within the enlarged portion 2 of the frame and thus means is provided for steering or directing the traction wheels 25 and 26. At the same time through the instrumentality of the connecting rod 43 with the yoke 31 which forms a component part of the said truck frame, the frame 41 of the caster wheel 40 is swung so that the caster wheel 40 is steered simultaneously with the steering of the traction wheels 25 and 26. The parts are so connected however that when the traction wheels 25 and 26 turn in one direction the caster wheel 40 is simultaneously turned in the opposite direction. Thus it is possible to turn the machine around in a comparatively short space.

Hangers 51 form component parts of the frame 1 and are located at points intermediate the ends thereof. The said hangers are provided with vertically disposed elongated slots 52 in which are located the end portions of a beam 53. Standards 54 are fixed to the beam 53 and at their lower ends carry furrow openers 55. Colters 56 are also mounted upon the beam 53 and are located in advance of the furrow openers 55 in the usual manner. Cross bars 57 are located upon the intermediate portion of the frame 1 and are in turn provided with approximately arcuate intermediate portions. A frame 58 is slidably mounted upon the cross bars 57 and a lever mechanism 59 is mounted upon the rear portion of the frame 1 and is operatively connected with the said frame 58 and is adapted when operated to slide the frame 58 along the intermediate arcuate portions of the cross bars 57. Pintles 60 are journaled in the frame 58 and are provided at their ends with fixed pinions 61. A lever 62 is fulcrumed upon the frame 58 and is provided at its lower end with an arcuate portion having gear teeth 63 which gear teeth mesh with the pinions 61 upon the pintles 60. Arms 64 are fixed to the pintles 60 and the lower ends of the said arms 64 are pivoted to collars 65 which may be slidably mounted upon the intermediate portion of the beam 53. By this arrangement it will be seen that by swinging the lever 62 through the intermeshing gear teeth 63 and pinions 61, the pintles 60 will be rotated upon their axes whereby the arms 64 will be swung and through the connecting collars 65 the beam 53 will be raised and lowered in the slots 52 of the hangers 51. Thus means is provided for raising and lowering the furrow openers 55 and colters 56. Also by swinging the lever 59 the frame 58 may be moved along the intermediate arcuate portions of the cross bars 57 and thus through the arms 64 and collars 65 the beam 53 will be turned in the elongated slots 52 provided in the hangers 51 and thus means is provided for supporting the furrow openers 55 at a desired angle with relation to the surface of the soil.

Having described the invention what I claim as new and desire to secure by Letters Patent is:—

A tractor, having a main frame, a steering caster wheel mounted centrally in the rear end thereof and a sole support therefor, a rotatable axle, a pair of traction wheels connected thereto, said caster wheel being adapted to run within the furrow and having its engaging line below but in parallel with the line of contact of the traction wheels, a yoke mounted at the forward end of the frame, a circular frame secured to the terminals of the yoke, and having the axle passing through the frame and yoke, a vertically disposed stub shaft mounted for rotation in the yoke, co-acting gears carried by the lower ends of the stub shaft and axle, a circular guiding means carried by the main frame and surrounding the circular frame, a motor carried by the main frame, means operably connecting the upper end of the stub shaft and motor, whereby the yoke is permitted an oscillatory movement to steer the machine by the traction wheels and simultaneously transmit motion to the traction wheels, and means for operably connecting the yoke and caster wheel to permit steering co-action between said yoke and said caster wheel.

In testimony that I claim the foregoing as my own, I have hereto affixed my signature in the presence of two witnesses.

GEORGE BOETTLER.

Witnesses:
GEORGE H. WALLENBROCK,
C. DANDT.

Copies of this patent may be obtained for five cents each, by addressing the "Commissioner of Patents, Washington, D. C."